No. 860,430. PATENTED JULY 16, 1907.
S. A. ZELLER.
NUT LOCK.
APPLICATION FILED NOV. 21, 1906.
Fig. 1.
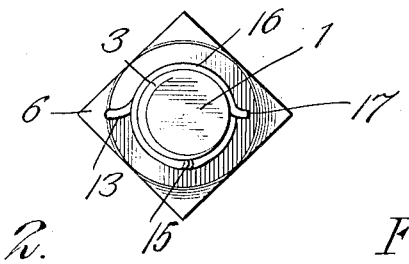
Fig. 2. Fig. 3.
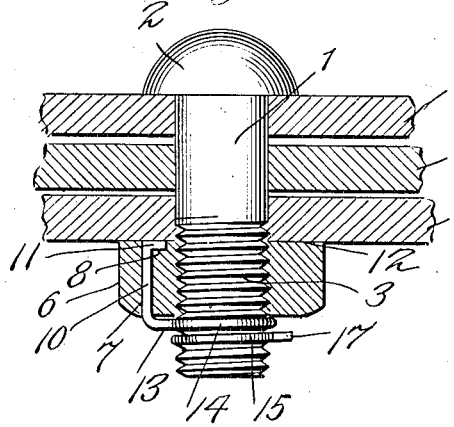 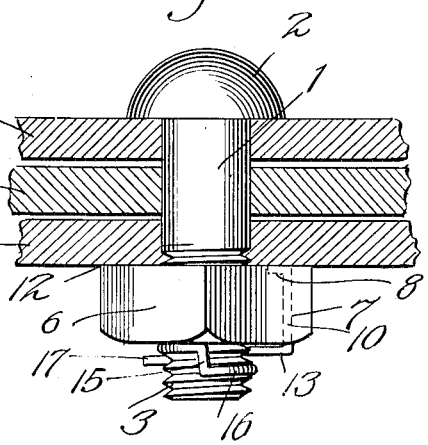
Fig. 4.
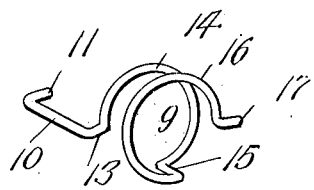
Inventor
Sebay A. Zeller
Witnesses
By Victor J. Evans
Attorney

UNITED STATES PATENT OFFICE.

SEBAY A. ZELLER, OF NEW FREEDOM, PENNSYLVANIA.

NUT-LOCK.

No. 860,430.　　　　Specification of Letters Patent.　　　　Patented July 16, 1906.

Application filed November 21, 1906. Serial No. 344,488.

*To all whom it may concern:*

Be it known that I, SEBAY A. ZELLER, a citizen of the United States of America, residing at New Freedom, in the county of York and State of Pennsylvania, have invented new and useful Improvements in Nut-Locks, of which the following is a specification.

This invention relates to nut locks, and one of the principal objects of the same is to provide simple and efficient means for locking a nut upon a bolt which will permit the nut to be readily readjusted at any time.

Another object of the invention is to provide means for locking a nut upon a bolt which will not require the mutilation of the bolt or nut, and which can be readily withdrawn from the bolt, and which will permit the readjustment of the nut upon said bolt.

These and other objects may be attained by means of the construction illustrated in the accompanying drawings, in which:

Figure 1 is an end elevation of a bolt having my improved lock nut secured thereto. Fig. 2 is a sectional view showing a bolt passing through the plates and showing the nut in section applied to the bolt. Fig. 3 is a view showing the three plates in section and the bolt and nut in elevation. Fig. 4 is a detail perspective view of the spring.

Referring to the drawing for a more particular description of my invention, the numeral 1 designates a bolt of ordinary construction provided with a head 2 and threaded portion 3. As shown in Figs. 2 and 3, the bolt 1 is passed through two fish plates 4 disposed upon opposite sides of the web 5 of a railway rail, and fitted to the threaded portion 3 of said bolt is a nut 6. The nut 6 is provided with an opening 7 which extends through the nut outside its threaded bore, said opening terminating in a recess 8 extending inward toward the threaded bore of the nut, as shown in Fig. 2 and in dotted lines in Fig. 3. A spring 9, shown in detail in Fig. 4 is provided with a shank 10 which extends through the opening 7 in the nut and is provided with a right angularly bent terminal lug 11 which is seated in the recess 8 in the nut, said lug lying flush with the inner face 12 of said nut. Extending from the shank 10 is an angular bend 13 and projecting from said bend the spring is provided with a partial coil 14 which terminates in an offset portion 15. From the outer end of the offset portion 15, a partial coil 16 extends and terminates in an outwardly projecting lip or finger piece 17. The two partial coils 14 and 16 of the spring are seated in contiguous threads in the bolt 1, said coils exerting their stress around the bolt to prevent the same from turning and to prevent the nut from turning on the bolt, the offset portion 15 extending across from one thread to the other, as shown in Fig. 3.

To assemble the parts, the shank 10 of the spring is passed through the opening 7 in the nut, and the lug 11 is then bent down to secure the spring to the nut. The threaded bolt is passed through the fish plates and through the web of the rail and the nut is connected to the bolt in the ordinary way.

From the foregoing it will be obvious that the nut 6 can be readily tightened upon the bolt whenever it is considered necessary to readjust the nut upon the bolt, and by raising upward upon the finger piece 17, the nut can be removed from the bolt.

My nut lock is of simple construction, does not interfere with the readjustment of the nut or removal thereof, and can be constructed at slight cost, and applied to any bolt of a given size.

Having thus described the invention, what I claim is:

The herein described nut lock comprising a bolt of usual construction, a nut fitted to said bolt, said nut having an opening through the same at the side of its threaded bore, and a recess extending from said opening upon the inner face of the nut toward the threaded bore, a spring provided with a shank passed through the opening in the nut and provided with a lug seated in said recess in the inner face of the nut and lying flush with said inner face of said nut, two partial coils formed on the outer end of the spring to engage the threads on the bolt, an offset connecting said partial coils, and a terminal outwardly extending finger piece formed on the outer end of the spring, essentially as described.

In testimony whereof, I affix my signature in presence of two witnesses.

SEBAY A. ZELLER.

Witnesses:
　PETER SHUCHART,
　MARTIN S. PAINTER.